United States Patent [19]

Lemberger et al.

[11] Patent Number: 5,132,724
[45] Date of Patent: Jul. 21, 1992

[54] OPENING AND CLOSING MECHANISM FOR A LASER IMAGER FILM CARTRIDGE

[75] Inventors: Richard R. Lemberger; Paul C. Schubert; Terrence H. Joyce, all of St. Paul, Minn.

[73] Assignee: Minnesota Mining and Manufacturing Company, St. Paul, Minn.

[21] Appl. No.: 656,734

[22] Filed: Feb. 19, 1991

[51] Int. Cl.$^5$ ............................................. G03B 27/58
[52] U.S. Cl. ..................................... 355/72; 354/275; 354/276; 354/277; 352/75; 352/76
[58] Field of Search ............... 355/75, 72; 352/75, 352/76; 354/276, 272, 275

[56] References Cited

U.S. PATENT DOCUMENTS

| | | |
|---|---|---|
| 330,182 | 6/1885 | Wilcox . |
| 1,098,844 | 10/1914 | Schmuck . |
| 1,536,345 | 5/1925 | Jones et al. . |
| 4,727,391 | 2/1988 | Tajima et al. ................. 354/277 |
| 4,853,724 | 8/1989 | Tajima et al. ................. 354/277 |
| 4,876,706 | 10/1989 | Tajima ........................... 354/277 |
| 4,937,605 | 6/1990 | Hoffman ........................ 354/276 |
| 4,992,815 | 2/1991 | Kudo .............................. 354/277 |

FOREIGN PATENT DOCUMENTS

PCT/EP88/-
00166 9/1988 PCT Int'l Appl. .

OTHER PUBLICATIONS

*Fundamentals of X-ray Physics & Technique.* U.S. Naval Medical School Publication 1958, pp. i,ii, 208, 379-382.

Primary Examiner—Monroe H. Hayes
Attorney, Agent, or Firm—Gary L. Griswold; Walter N. Kirn; Walter C. Linder

[57] ABSTRACT

An opening and closing mechanism for photographic film cartridges of the type having a film-receiving tray with outwardly extending front and side lips and a flexible cover for the tray resealably engaged with the lips. The opening and closing mechanism includes a cartridge-receiving base with front and side lips for supporting the front and side lips of the tray. A carriage is mounted for movement with respect to the base. An elongated roller including cartridge cover-engaging fingers is rotatably and movably mounted to the carriage. Springs bias the roller toward engagement with the lips of the base. A carriage drive assembly includes a roller drive linkage, a track drive linkage, a motor and a shuttle linkage. A rack is mounted adjacent to the base for engagement by the track drive linkage. During the cartridge opening stroke, the shuttle linkage couples the motor to the roller drive linkage causing the roller to rotate in a first direction and peel the cover from the tray and wind the cover onto the roller. During the cartridge closing stroke, the shuttle linkage couples the motor to the track drive linkage to drive the carriage with respect to the base and rotate the roller in a second direction to unwind the reseal the cover onto the tray.

26 Claims, 6 Drawing Sheets

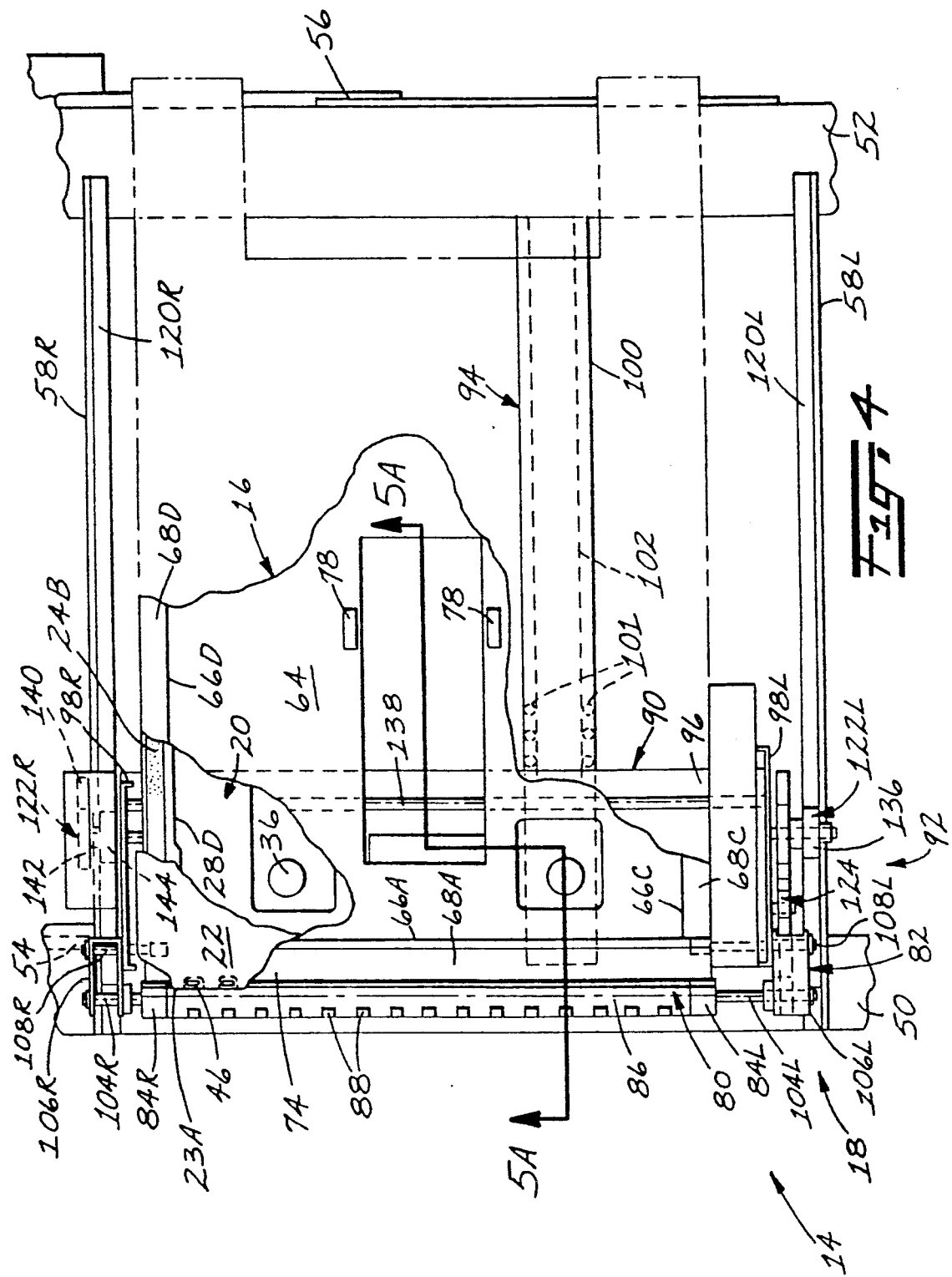

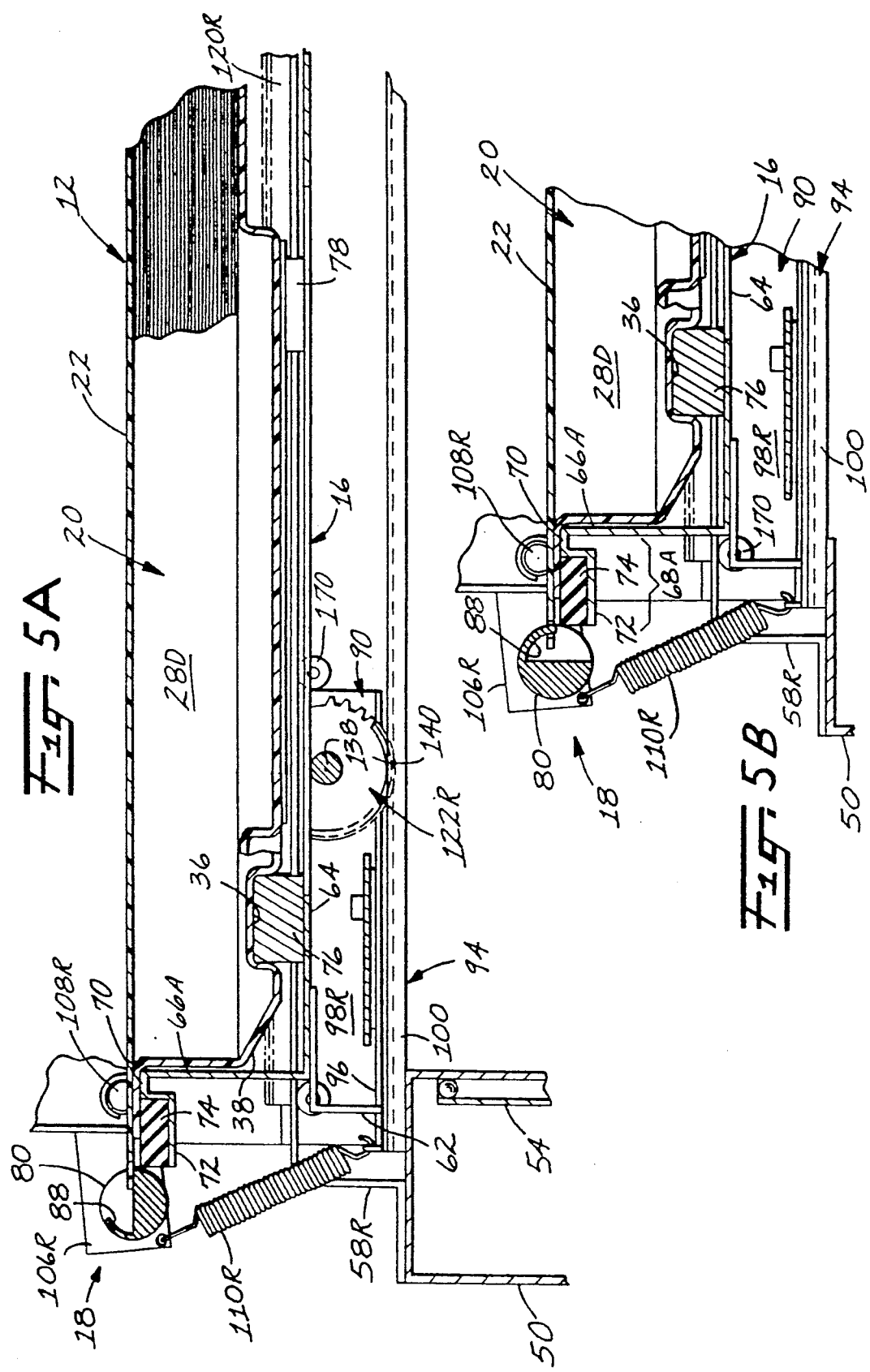

OPENING AND CLOSING MECHANISM FOR A LASER IMAGER FILM CARTRIDGE

BACKGROUND OF THE INVENTION

The present invention relates generally to mechanisms for opening and closing photographic film packages. In particular, the present invention is a mechanism for opening and resealing film cartridges loaded in a laser imager.

X-ray and other types of medical imaging photographic film are packaged in photo-opaque (i.e., light-tight) containers. Examples of such film packages are disclosed in the Wilcox U.S. Pat. No. 330,182, the Jones et al. U.S. Pat. No. 1,536,345 and the 1958 U.S. Naval Medical School publication entitled "Fundamentals of X-ray Physics & Technique". Medical imaging film commercially available from the 3M Company of St. Paul Minn., the assignee of the present invention, is packaged in laminated metal foil and polymer sheet bags. The film is usually removed from these containers and loaded into the x-ray machines or other medical imagers under darkroom conditions. This procedure is inconvenient and time consuming.

The Schmuck U.S. Pat. No. 1,098,844 and International Application No. PCT/EP88/00166 disclose film packages which can be loaded directly into a camera or other imaging device, thereby alleviating the need for a darkroom. However, the Schmuck film package is a relatively inefficient design and requires manual manipulation to bring the film into exposure position. The Schmuck package is therefore incompatible with the automatic film handling mechanisms typically used in modern imaging systems. The cassette shown in the International Application apparently holds only one sheet of film, necessitating inconvenient and time consuming reloading procedures for each use.

The Tajima et al. U.S. Pat. No. 4,727,391 discloses a package for sheet film and a loading device for the package. The package includes a tray and a flexible cover peelably attached to the tray by an adhesive. The package is loaded into the loading mechanism with the distal end of the cover extending from the mechanism in a light shielding condition between a roller and closure member. The distal end of the cover is gripped and manually pulled to open the package.

Commonly assigned U.S. patent application Ser. No. 07/656,610 entitled "Resealable Film Cartridge For A Laser Imager", which was filed on even date herewith, discloses a film cartridge for multiple sheets of film which is capable of being resealed after it has been opened. The cartridge is configured to be conveniently loaded directly into an imager under daylight conditions. Since it is sometimes necessary to load an imager with a different type or size of film before all the film already in the imager has been used, the cartridge can be resealed and conveniently removed from the imager under daylight conditions without wasting any remaining film.

Use of the resealable cartridge disclosed in the above identified patent application requires a mechanism which can open and reseal the cartridge within the imager. The mechanism must be capable of reliably performing the opening and closing functions. To be commercially viable it must also be capable of being efficiently manufactured.

SUMMARY OF THE INVENTION

The present invention is a reliable and relatively inexpensive mechanism for opening and closing resealable photosensitive media cartridges of the type including a tray with a media access opening and a cover for the access opening which is resealably engaged with the tray. The mechanism includes a base, a cover engaging mechanism and a drive mechanism. The base receives and supports the cartridge tray. The cover engaging mechanism releasably engages the cartridge cover. The drive mechanism drives the cover engaging mechanism through cartridge opening and cartridge closing strokes. During the cartridge opening stroke, the cover is peeled from the tray. During the cartridge closing stroke, the cover is resealably engaged with the tray.

In a preferred embodiment the mechanism is configured for use with a cartridge of the type having outwardly extending front and side lips and a flexible cover resealably engaged with the lips. The base includes front and side lips for supporting the lips of the cartridge tray. The cover engaging mechanism includes a roller with cover-engaging fingers. The drive mechanism includes a carriage mounted for movement with respect to the base, a mount for rotatably and movably mounting the roller to the carriage, springs for biasing the roller toward engagement with the lips of the base, and a carriage drive assembly. The carriage drive assembly rotates the roller in a first direction to peel the cover from the tray and wind the cover onto the roller during the cartridge opening stroke. During the cartridge closing stroke the carriage is driven with respect to the base to rotate the cover in a second direction and to unwind and reseal the cover onto the tray.

In still other embodiments the carriage drive assembly includes a roller drive linkage for causing the rotation of the roller during the opening stroke, and a track drive linkage for driving the carriage during the closing stroke. A rack is mounted with respect to the base and is configured for engagement by the track drive linkage. A motor is mounted to the carriage, and a solenoid actuated shuttle linkage couples the motor to the roller drive linkage and to the track drive linkage. The shuttle linkage couples the motor to the roller drive linkage and disengages the motor from the track drive linkage to enable free movement of the carriage during the cartridge opening stroke. During the cartridge closing stroke, the shuttle linkage couples the motor to the track drive linkage and disengages the motor from the roller drive linkage to enable free rotation of the roller.

BRIEF DESCRIPTION OF THE DRAWINGS

FIG. 4 is a top view of an opening/closing mechanism for the cartridge with a portion of the cartridge broken away and shown loaded in the mechanism.

FIG. 5A is a sectional side view of a portion of the opening/closing mechanism shown in FIG. 4.

FIG. 5B is a sectional side view of a portion of the opening/closing mechanism shown in FIG. 4, with the pressure roller engaging the cartridge cover.

FIG. 8 is a side view of a portion of an alternative embodiment of the opening/closing mechanism.

DETAILED DESCRIPTION OF THE PREFERRED EMBODIMENTS

Figure 1:
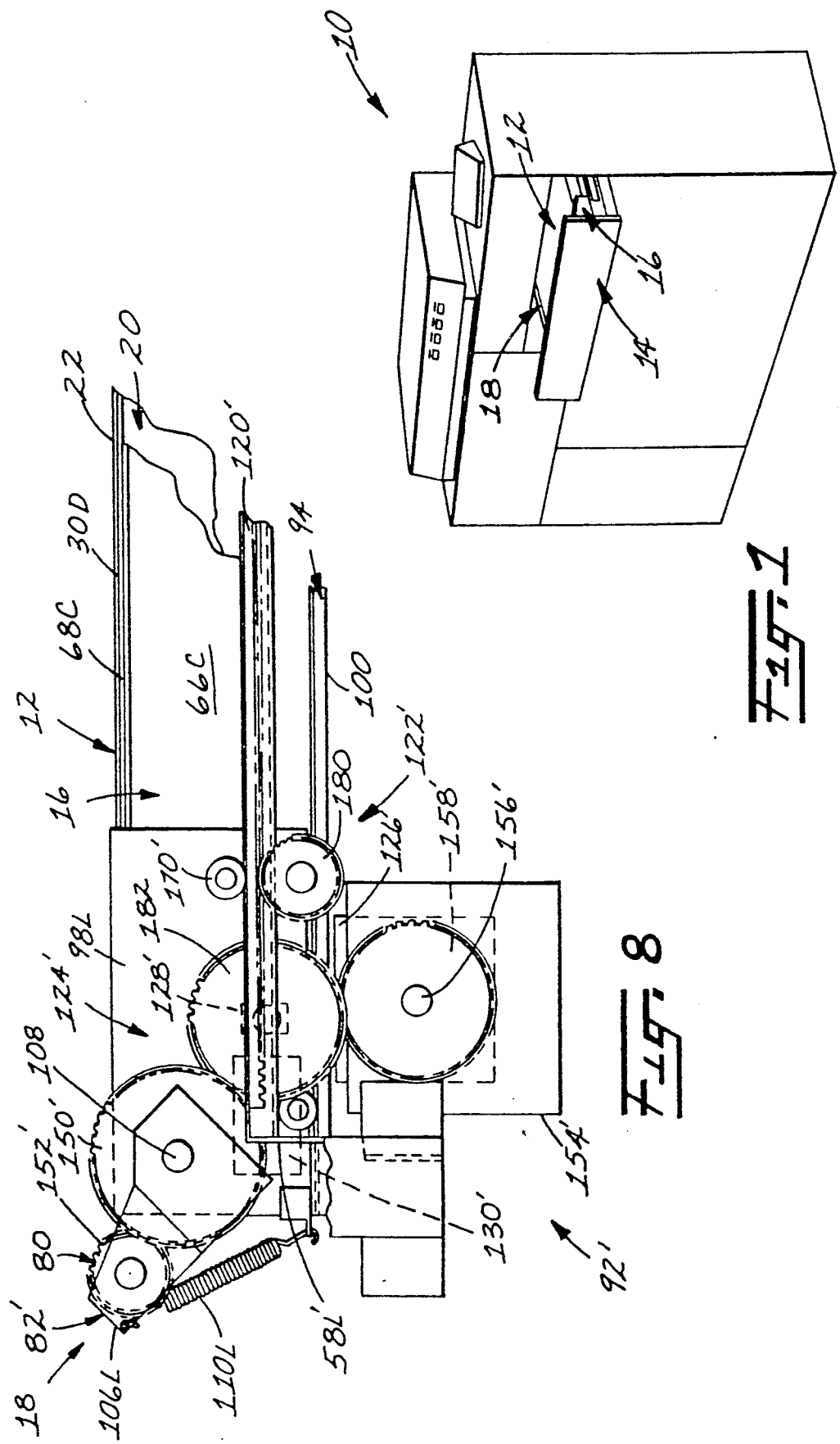
FIG. 1 is an illustration of a laser imager configured for use with a resealable film cartridge of the present invention.

FIG. 1 is an illustration of a digital laser imager 10 which includes a film cartridge opening/closing mechanism 18 in accordance with the present invention. In the embodiment shown, laser imager 10 includes a drawer 14 which is opened to provide access to a base 16 into which a resealable film cartridge 12 is loaded. Cartridge opening/closing mechanism 18 is also mounted to drawer 14. After a film cartridge 12 has been loaded into base 16, drawer 14 is closed to seal the cartridge within a light-tight compartment. Opening/closing mechanism 18 then opens cartridge 12 to permit access to sheets of film (not visible in FIG. 1) in the cartridge. Sheets of film are removed from the opened cartridge 12 and imaged by other subsystems (not shown) of laser imager 10. The imaged film is temporarily stored in a magazine (not shown) before being removed from imager 10 for subsequent processing. Alternatively, the imaged film can be automatically fed to a docked or attached film developer (not shown) for processing.

Opening/closing mechanism 18 is also actuated to close cartridge 12 before the cartridge is removed from imager 10. Since cartridge 12 is resealable, it can be removed from imager 10 before all the film within the cartridge has been exposed. Cartridges 12 with different sizes or types of film media can therefore be conveniently loaded into and removed from laser imager 10 as needed, without wasting any unused film remaining within the cartridge.

Figure 2:
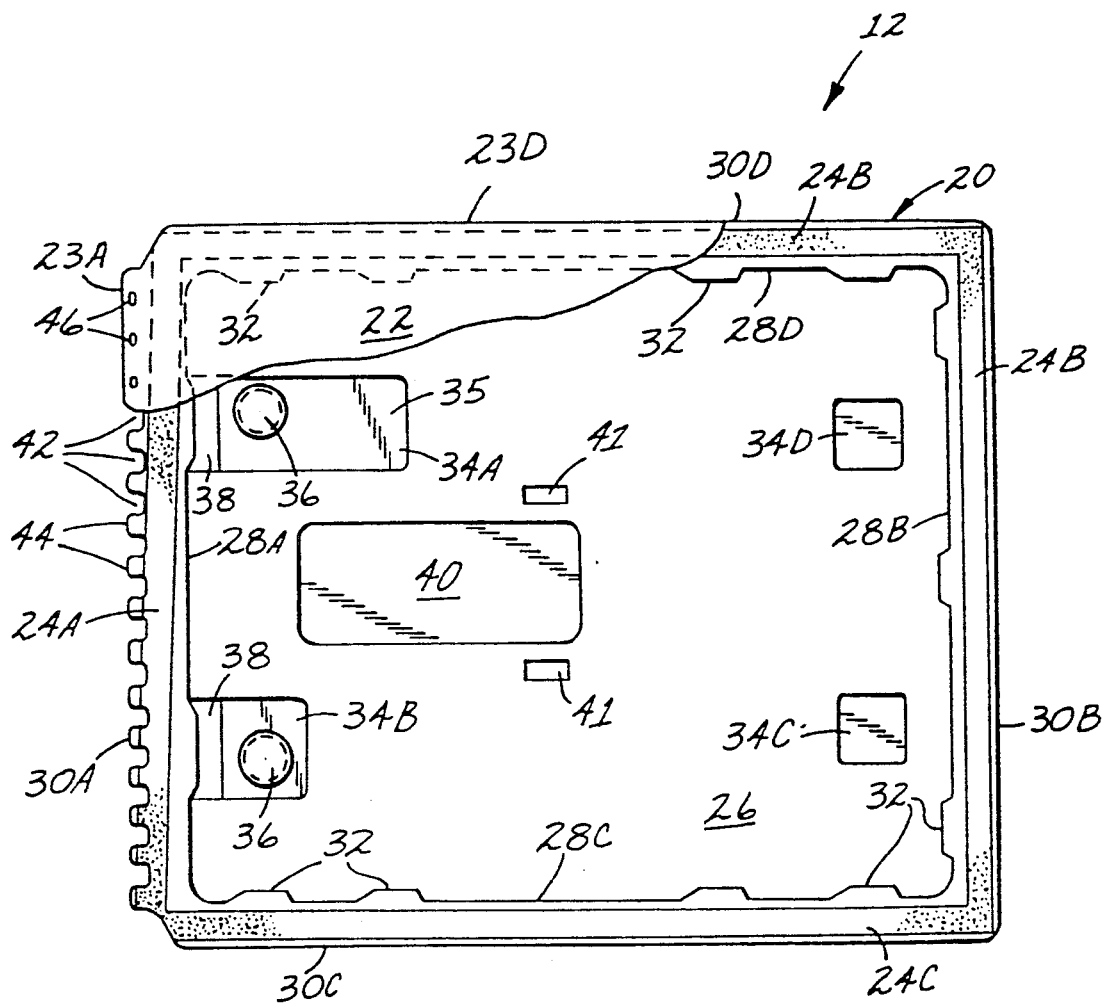
FIG. 2 is top view of a resealable film cartridge in accordance with the present invention, with a portion of the cover broken away.
Figure 3:
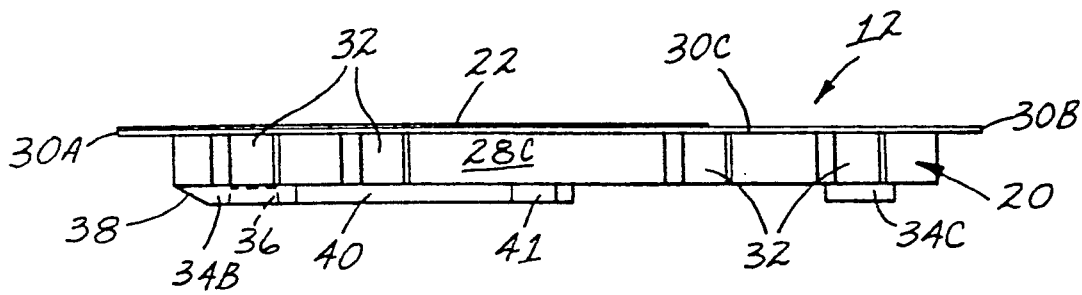
FIG. 3 is a side view of the cartridge shown in FIG. 2.

Resealable cartridge 12 can be described in greater detail with reference to FIGS. 2 and 3. As shown, cartridge 12 includes an optically opaque polymer film-receiving tray 20 and a flexible, optically opaque polymer cover 22. Cover 22 is resealably mounted to tray 20 by adhesive segments or strips 24A-24D. Tray 20 is preferably molded in one piece from a relatively inexpensive and photo-inert polyolefin material so that it is economically feasible to dispose of the cartridge following a single use. In one embodiment tray 20 is molded from 555-ABS material which is commercially available from the Dow Chemical Company. Polystyrene materials having appropriate characteristics can also be used.

Figure 5C:
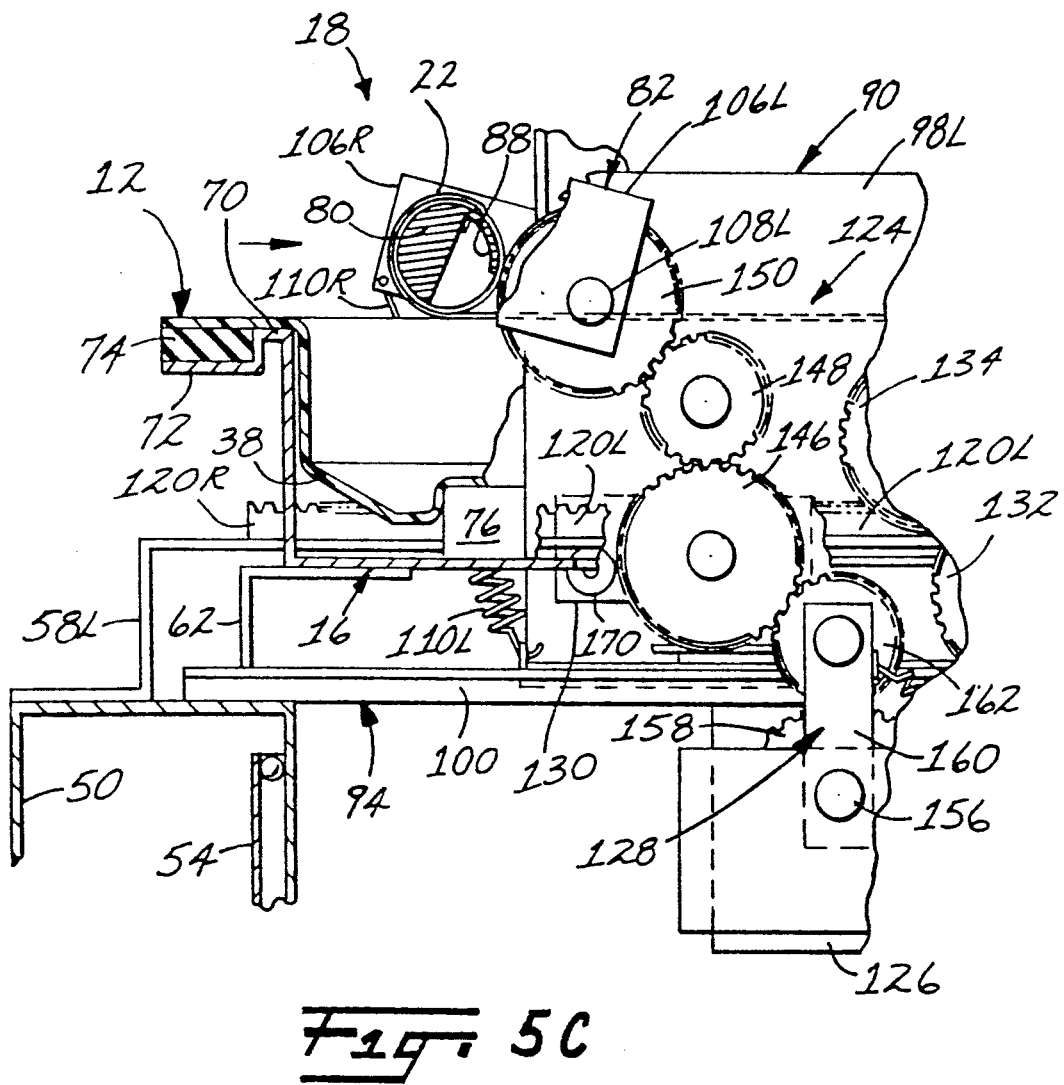
FIG. 5C is a sectional side view of a portion of the opening/closing mechanism shown in FIG. 4, with the cover partially removed from the cartridge.
Figure 6:
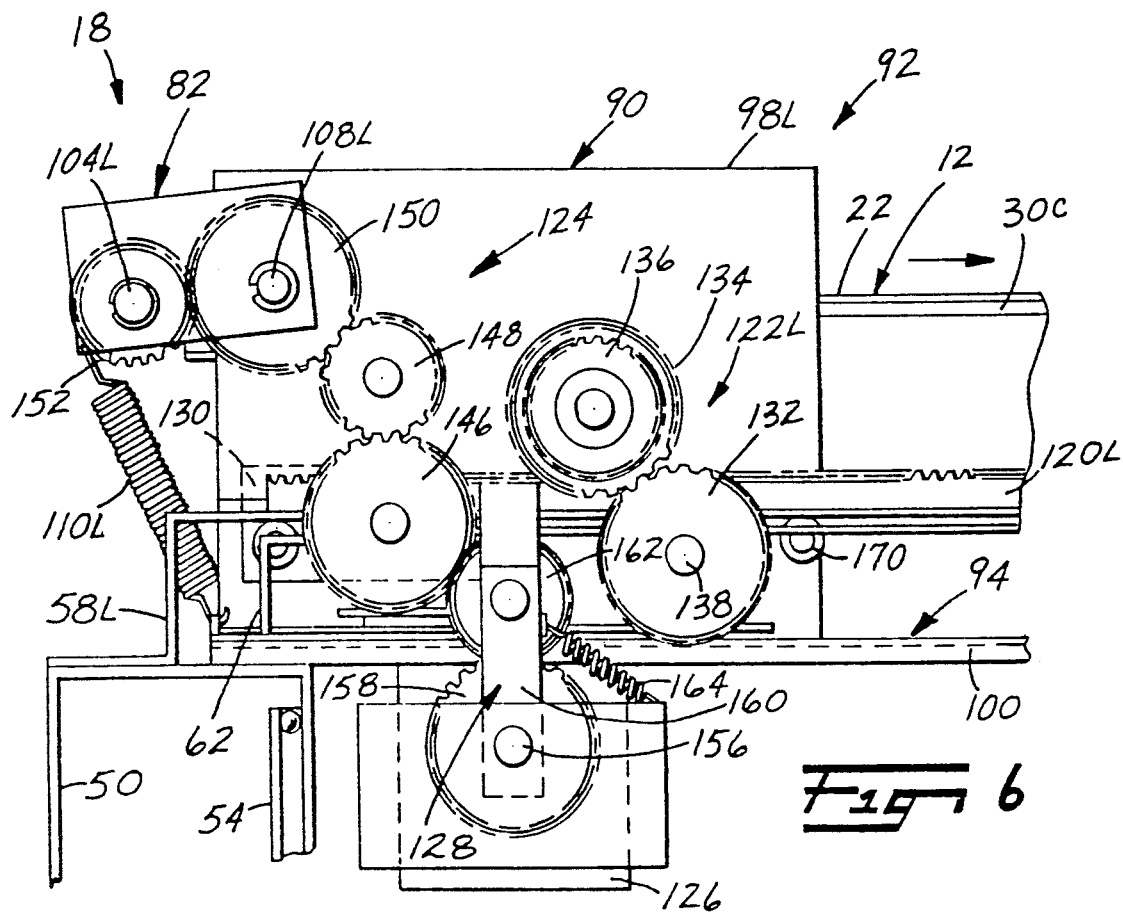
FIG. 6 is a side view of a portion of the opening/closing mechanism shown in FIG. 4.
Figure 7:
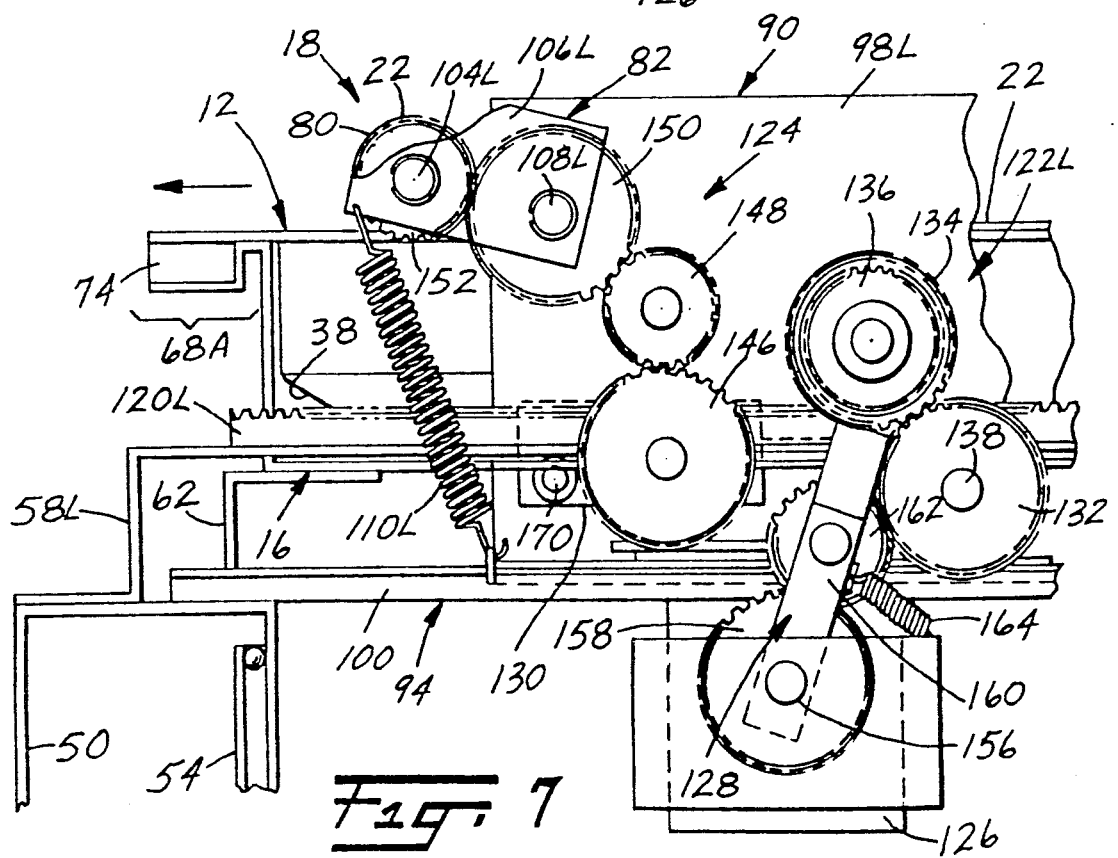
FIG. 7 is a side view of a portion of the opening/closing mechanism shown in FIG. 4, with the cover partially removed from the cartridge.

Tray 20 is a relatively shallow member and includes a generally planar bottom wall 26, front wall 28A, rear wall 28B and side walls 28C and 28D. Lips 30A-30D extend outwardly from the upper edges of respective walls 28A-28D, and circumscribe a film access opening of tray 20. Inwardly projecting guides 32 are formed on walls 28A-28D to properly position sheets of film (not shown) within tray 20. Feet 34A-34D are formed into and extend downwardly from bottom wall 26 to support cartridge 12 within base 16 of laser imager 10. Bottom wall 26 also includes positioning recesses 36 which can be tapered and extend into tray 20 from the side of the bottom wall opposite walls 28A-28D (i.e., from the exterior side of the tray). Positioning recesses 36 are configured to receive positioning lugs (FIG. 5A) extending from base 16. The positioning lugs secure and properly orient cartridge 12 within laser imager 10. In the embodiment shown, positioning recesses 36 are molded into feet 34A and 34B adjacent to front wall 28A. A media presence monitoring well 35 is also formed in bottom wall 26. Media presence monitoring sensors of imager 10 (not shown) extend into well 35 below the surface of bottom wall 26 when all film has been removed from tray 20.

Feet 34A and 34B (ie., those adjacent to front wall 28A) also include ramp surfaces 38 which slope downwardly from the lower edge of the front wall to the bottom of the feet. Ramp surfaces 38 guide feet 34A and 34B over the positioning lugs in imager base 16 as cartridge 12 is being loaded into the base. The embodiment of tray 20 illustrated in FIGS. 2 and 3 also includes a recess 40 in bottom wall 26 which forms a platform on the bottom exterior of tray 20. The platform formed by recess 40 is configured to receive an information bearing medium such as a bar code which includes recorded information pertaining to the characteristics of film within cartridge 12. A pair of feet 41 are formed as recesses in bottom wall 26 adjacent recess 40 to insure proper positioning of the information bearing medium with respect to a reading device (not shown) of laser imager 10. Reinforcing ribs (not shown in FIGS. 2 and 3) can also be molded into bottom wall 26 and/or side walls 28A-28D to increase the rigidity of tray 20.

The forwardmost or leading edge of front lip 30A also includes a series of evenly spaced cut-out sections 42. Cut-out sections 42 form a series of spaced projections 44 on the leading edge of lip 30A. Cut-out sections 42 and projections 44 cooperate with yet to be described aspects of cover 22 and opening/closing mechanism 18 to facilitate the opening and subsequent closing of cartridge 12.

Cover 22 is a flexible, photo-inert and optically opaque sheet of material sized to extend over the access opening of tray 20. Cover 22 has edges 23A-23D (only edges 23A and 23D are shown in FIG. 2) which extend between and mate with tray lips 30A-30D, respectively. In one embodiment, cover 22 is a foil laminate formed by polyethylene bonded layers of one mil thick polyethylene, thirty five hundredths mil thick aluminum foil and two mil thick polypropylene. This foil laminate cover 22 is of a sufficiently stretchy nature to prevent the cover from popping off tray 20 when cartridge 12 is flexed, yet rigid enough to prevent detrimental amounts of stretch related buckling when the cover is rolled up. The foil laminate cover 22 also provides for the integrity of a vacuum cartridge 12.

A paper or polyester reinforcing strip (not separately shown) can be added to the leading or front edge 23A of cover 22 to increase cover rigidity above projections 44 and facilitate the operation of opening/closing mechanism 18. In one embodiment, the reinforcing strip is a one quarter inch wide, six mil thick, strip of mylar. The front edge 23A of cover 22 extends over the tray cut-out sections 42, and includes elongated apertures 46 which are positioned over the cut-out sections when the cover is sealed onto tray 20. Apertures 46 facilitate the engagement of opening/closing mechanism 18 with cover 22 in a manner described below.

Adhesive segments or strips 24A-24D can be a coated liquid adhesive. In one embodiment the liquid adhesive is an emulsion based acrylic polymer, such as that disclosed in the Brown et al. U.S. Pat. No. 4,629,663, mixed with 40% Aquatac 6085 tackifier commercially available from Arizona Chemicals of Panama City, Fla. Alternatively, strips 24A-24D can be portions of a one-piece adhesive gasket applied to lips 30A-30D from a transfer liner. By way of example, strips 24A-24D of the gasket can be pressure sensitive adhesive (PSA) such as 9460 Transfer Adhesive which is commercially available from the 3M Company of St. Paul, Minn. Adhesive strips 24A-24D are photo-inert and provide a optically opaque and resealable seal between tray 20 and cover 22. Adhesive strips 24A-24D tend to more aggressively adhere to tray 20, so they will remain on lips 30A-30D when cover 22 is peeled away. As shown in FIG. 2, adhesive strip 24A extends over at least a portion of projections 44 so the leading edge 23A of cover 22 is releasably but securely held to lip 30A to facilitate trouble-free operation of opening/closing mechanism 18. The forwardmost edge of adhesive strip 24A can also be oriented at a non-parallel angle with respect to the front edge of lip 30A, and therefore at a non-perpendicular angle with respect to lips 30C and 30D (i.e., at a non-perpendicular angle with respect to the path of motion of the cover as it is opened and resealed). This orientation enables the front or forward edge of cover 22 to be more easily peeled away from lip 30A by opening/closing mechanism 18.

Base 16 and opening/closing mechanism 18 are described in greater detail with reference to FIGS. 4, 5A-5C, 6 and 7. As shown in FIG. 4, drawer 14 includes inverted U-shaped frame members 50 and 52. Frame members 50 and 52 are mounted for reciprocal linear motion into and out of the light-tight compartment of laser imager 10 by telescopic slide tracks 54 and 56, respectively. Additional structural support is provided by cross members 58L and 58R which extend between frame members 50 and 52 at spaced locations. Base 16 is mounted to drawer 14 by brackets 62 and includes bottom wall 64, front wall 66A and side walls 66C and 66D.

Lips 68A, 68C and 68D extend outwardly from the upper edges of base walls 66A, 66C and 66D, respectively (i.e., from the edges opposite bottom wall 64). As is perhaps best shown in FIGS. 5A-5C, forward lip 68A includes a portion 70 adjacent forward pan wall 66A which is flush with side lips 66C and 66D, and a lower, outwardly extending support portion 72. A strip 74 of resilient material is mounted to outwardly extending portion 72, and has its upper surface flush with lips 66C and 66D. Base 16 also includes a pair of positioning lugs 76 which extend upwardly from bottom wall 64. Positioning lugs 76 can be tapered and are sized to fit within recesses 36 of cartridge tray 20. A pair of tray supports 78 also extend from bottom wall 64 of pan 16 and are oriented in such a manner as to be positioned under and support projections 41 of cartridge tray 20.

During use, film cartridge 12 is loaded into opened drawer 14 by sliding the cartridge, front lip 30A first, into base 16 toward front lip 68A. As cartridge 12 approaches its proper position in base 16, ramp surfaces 38 will engage positioning lugs 76 causing feet 34A and 34B to be raised over the lugs and causing forward lip 30A to be raised over front pan lip 68A. With continued motion cartridge 12 will drop into its loaded position with feet 34A and 34B resting on bottom pan wall 64, cartridge lips 30A, 30C and 30D resting on base lips 68A, 68C and 68D respectively, and positioning lugs 76 extending into tray recesses 36. Cartridge 12 is thereby securely and accurately positioned within base 16.

After cartridge 12 has been loaded into base 16 in the manner described above, drawer 14 is closed. Cartridge 12 is then opened, and closed or resealed, by opening/closing mechanism 18. Opening/closing mechanism 18 includes pressure roller 80 and roller drive mechanism 82. Roller 80 is an elongated member having ends 84L and 84R of circular cross section aligned with base lips 68C and 68D, respectively. Pressure roller 80 also includes a cut-out or wrapping portion 86 which extends between ends 84L and 84R. Wrapping portion 86 has a perimeter which is less than the circumference of ends 84L and 84R, and is half circular in cross section in the embodiment shown. A plurality of cover-engaging fingers 88 extend from wrapping portion 86 of pressure roller 80. In the embodiment shown, fingers 88 are curved. Fingers 88 and wrapping portion 86 of pressure roller 80 both have a radius of curvature equal to the radius of ends 84L and 84R. Fingers 88 are sized and spaced to fit within apertures 46 in the front edge of cartridge cover 22.

Roller drive mechanism 82 includes a carriage 90 and associated drive assembly 92. Drive assembly 92 causes carriage 90 and pressure roller 80 to be reciprocally driven along a linear path of motion through cartridge opening strokes and cartridge closing strokes. Carriage 90 is guided along the path of motion by guide track 94.

Carriage 90 includes an elongated base plate 96 having a pair of uprights 98L and 98R at its opposite ends. Base plate 96 extends in a direction generally transverse to the path of motion of carriage 90, and is positioned below base 16. Uprights 98L and 98R extend upwardly from baseplate 96 at locations beyond the outer edges of base lips 68C and 68D, respectively. Guide track 94 includes an elongated track member 100 oriented parallel to the carriage path of motion and having its opposite ends mounted to drawer frame members 50 and 52. Guide track 94 also includes a slide member 102. Slide member 102 is mounted to the lower side of carriage base plate 96 and is slidably engaged with track member 100 by means of bearings 101.

Shafts 104L and 104R extend from opposite ends of pressure roller 80 and are swingably mounted to carriage uprights 98L and 98R by brackets 106L and 106R, respectively. Shafts 104L and 104R are rotatably mounted to a forward end of brackets 106L and 106R, respectively. Rearward ends of brackets 106L and 106R, are pivotally mounted to uprights 98L and 98R, respectively, by pivot pins 108L and 108R. Pressure roller 80 is biased downwardly (toward pan lips 68A, 68C and 68D) by a pair of springs 110L and 110R. Spring 110R is connected between bracket 106R and carriage upright member 98R. Spring 110L is connected between bracket 106L and carriage upright 98L. Stop tabs (not visible) on uprights 98L and 98R engage brackets 106L and 106R, respectively, to limit the downward motion of pressure roller 80. As shown in FIG. 5A, in its lowermost position, the center of rotation of roller 80 is at the level of base lip 68A.

Carriage drive assembly 92 includes racks 120L and 120R, track drive gear assemblies 122L and 122R, roller gear drive assembly 124, drive motor 126, shuttle linkage 128, and solenoid 130. Racks 120L and 120R are mounted teeth side up to the upper sides of cross members 58L and 58R, respectively. Track drive gear assembly 122L includes transfer gears 132 and 134 and pinion gear 136. Transfer gear 134 and pinion gear 136 are coaxially mounted to one another and rotatably mounted to carriage upright 98L. Transfer gear 132 is also rotatably mounted to carriage upright 98L, and engages transfer gear 134. Pinion gear 136 engages rack 120L and drives carriage 90 with respect to base 16 in response to the rotation of gear 132. A pair of rollers 170 are rotatably mounted to both carriage uprights 98L and 98R, and engage the lower side of respective cross members 58L and 58R to distribute forces acting on carriage 90 when the carriage is driven by drive assembly 92.

Track drive gear assembly 122R is coupled to gear 132 of assembly 122L by shaft 138 (FIG. 4), and includes transfer gears 140 and 142 and pinion gear 144. Gear 140 is mounted to shaft 138, and engages gear 142. Gears 142 and 144 are coaxially mounted to one another and rotatably mounted to carriage upright 98R. Pinion gear 144 engages rack 120R. Both the left (L) and right (R) sides of carriage 90 are thereby positively and synchronously driven in response to the rotation of gear 132.

Roller gear drive assembly 124 includes gears 146, 148, 150, and 152. Gears 146, 148 and 150 are all rotatably mounted to carriage upright 98L. Gear 150 is rotatably mounted about the axis of pivot pin 108L. Gear 152 is fixedly mounted about pressure roller shaft 104L. Gears 146, 148, 150 and 152 are engaged with one another in such a manner that rotation of gear 146 causes the rotation of pressure roller 80. Since gear 150 is mounted about the axis upon which pressure roller 80 swings (ie., pivot pin 108L), the pressure roller is positively driven at any point along its path of swinging motion.

Drive motor 126 is mounted with respect to carriage upright 98L by means of bracket 154, and has a drive gear 158 mounted to its drive shaft 156. Shuttle linkage 128 includes bracket 160 which is rotatably mounted about the axis of motor drive shaft 156, and a shuttle linkage gear 162. Gear 162 is rotatably mounted to bracket 160 and engages drive gear 158. Shuttle linkage 128 is configured in such as manner as to enable motor 126 to drive one of either carriage transfer gear 132 or roller gear 146. Spring 164 is coupled between bracket 154 and bracket 160, and biases the bracket and its linkage gear 162 toward carriage transfer gear 132. Solenoid 130 includes an actuator arm (not visible) coupled to bracket 160, and forces the bracket and its linkage gear 162 into engagement with gear 146 against the bias force of spring 164 when actuated.

The operation of opening/closing mechanism 18 can be described with reference to FIGS. 5A-5C, 6 and 7. Carriage 90 and pressure roller 80 are in the home position shown in FIGS. 5A and 6 when cartridge 12 is loaded and prior to the initiation of the cartridge opening stroke. As shown, springs 110L and 110R bias brackets 106L and 106R, respectively, in such a manner that at least a portion of pressure roller 80 is below cartridge lip 30A when the roller is in its home position. In the embodiment shown, the lip 30A of cartridge 12 extends over the wrapping portion 86 of pressure roller 80 to such an extent that apertures 46 in cartridge cover 22 are aligned with the rotational path through which fingers 88 will be driven. Roller gear drive assembly 124 is indexed in such a manner that wrapping portion 86 and fingers 88 of pressure roller 80 are positioned to enable the loading of cartridge 12 when the pressure roller is in its home position.

During the cartridge opening stroke, shuttle linkage 128 is driven against the bias force of spring 164 to force gear 162 into engagement with gear 146. Track drive gear assemblies 122L and 122R are thereby disengaged from motor 126, enabling carriage 90 to move freely about its path of motion with respect to cartridge 12. Pressure roller 80 is rotated through the linkage of gears 158, 162, 146, 148, 150 and 152 when motor 126 is actuated. During the initial rotation of roller 80, its teeth 88 will enter apertures 46 and engage cartridge cover 22 as shown in FIG. 5B. Carriage 90 does not move during this initial rotation of pressure roller 80. As cover 22 begins to be wound onto roller 80, the roller will "climb" upwardly and onto front lip 30A of cartridge 12 against the bias force of springs 110L and 110R. Continued rotation of pressure roller 80 causes cover 22 to be peeled away from cartridge tray 20, and wound onto the pressure roller. This forced winding of cover 22 onto pressure roller 80 causes carriage 90 to be "driven" or pulled rearwardly (i.e., towards rear wall 28B of cartridge 12). The opening stroke continues in this manner until pressure roller 80 has wound enough of cover 22 to open cartridge 12 to such an extent that the film (not shown) therein can be accessed. The cartridge opening stroke is discontinued by deactuating motor 126.

When it is desired to close or reseal cartridge 12, solenoid 130 is deactuated, enabling shuttle linkage 128 to force gear 162 into engagement with gear 132 of the track drive gear assembly 122L. The rotation of motor 126 thereby causes carriage 90 to be positively driven in a forward direction (ie., toward front lip 68A of base 16) through the engagement of pinion gears 136 and 144 with racks 120L and 120R, respectively. Pressure roller 80 is disengaged from motor 126, and is free to roll during this closing stroke motion. Cover 22 is thereby unwound from pressure roller 80 and positioned over the film access opening of tray 20 during the closing stroke. Springs 110L and 110R force roller 80 to exert sufficient pressure to seal cover 22 onto tray lips 30A, 30C, and 30D. The closing stroke motion ends when pressure roller 80 has been driven back to the home position shown in FIG. 5A.

Roller drive mechanism 82' and carriage drive assembly 92', alternative embodiments of drive mechanism 82 and drive assembly 92 described above, are illustrated in FIG. 8. Roller drive mechanism 82' and carriage drive mechanism 92' perform identical functions on roller 80 and carriage 90, respectively, as their counterparts, but are configured somewhat differently. Features shown in FIG. 8 which can be substantially identical to their counterparts shown in FIGS. 4, 5A-5C, 6 and 7 are identified by identical reference numerals, while features of mechanism 82' and assembly 92' which are functionally equivalent to their counterparts are identified by common and primed (i.e., X') reference numerals.

Carriage drive assembly 92' includes rack 120' track drive gear assembly 122', roller gear drive assembly 124', drive motor 126', shuttle linkage 128' and solenoid 130'. Rack 120' is mounted teeth side down to the lower side of cross member 58L'. Cross member 58L' is positioned directly adjacent base lip 68C. Track drive gear assembly 122' includes rack engaging pinion gear 180 which is rotatably mounted to carriage upright 98L. Roller 170' is mounted to upright 98L, and engages cross member 58L' opposite rack 120' from pinion gear 180. Although only the left side of carriage drive assembly 92' is shown, the right side includes a cross member, rack, pinion gear and roller which are configured in a manner similar to their counterparts on the left side but mounted with respect to carriage upright 98R. A shaft (not shown) couples pinion gear 180 to the pinion gear on the right side.

Shuttle linkage 128' includes a gear 182 which is rotatably mounted to solenoid 130'. Carriage 90 is driven through its cartridge opening stroke by actuating solenoid 130' in such a manner as to force gear 182 into engagement with gears 158' and 150'. Motor 126' is thereby disengaged from track drive gear assembly 122'. The actuation of motor 126' with gear 182 engaged with roller gear drive assembly 124' causes roller 80 to rotate and peel cover 22 from cartridge 12 in a manner similar to that described above. When solenoid 130' is actuated to force gear 182 into engagement with gears 158' and 180, the rotation of motor 126' will drive carriage 90 through its cartridge closing stroke, resealing cover 22 onto cartridge tray 20 in a manner similar to that described above.

Film cartridge 12 and opening/closing mechanism 18 offer a number of important advantages. Since the cartridge can be resealed, cartridges bearing film of different sizes and types can be used within the imager as needed (ie., can be resealed and removed at any time) without having to waste remaining film in any currently loaded cartridge. The opening/closing mechanism efficiently and reliably opens and reseals the cartridge. The cartridge is relatively inexpensive and easy to use, and can be disposed after all film has been imaged.

Although the present invention has bee described with reference to the preferred embodiments, those skilled in the art will recognize that changes may be made in form and detail without departing from the spirit and scope of the invention. By way of example, although the cartridge has been described as opaque and inert to visible light and near IR (780 nm) (i.e., "optically opaque and photo-inert"), the cartridge can be similarly designed for use with media sensitive to radiation of other wavelengths.

What is claimed is:

1. A mechanism for opening and closing a resealable photosensitive media cartridge of the type including a tray with a media access opening and a cover for the access opening resealably engaged with the tray, the mechanism comprising:
   a base for receiving and supporting the cartridge tray;
   a cover engaging mechanism for releasably engaging the cartridge cover; and
   a drive mechanism for driving the cover engaging mechanism through a cartridge opening stroke to peel the cover from the tray, and through a cartridge closing stroke to resealably engage the cover with the tray.

2. The opening and closing mechanism of claim 1 wherein:
   the cover engaging mechanism includes a roller with an engaging mechanism for releasably engaging the cover; and
   the drive mechanism includes a roller drive mechanism for rotating the roller in a first direction during the cartridge opening stroke to wind the cover onto the roller, and for rotating the roller in a second direction during the cartridge closing stroke to unwind and reseal the cover over the media access opening of the tray.

3. The opening and closing mechanism of claim 2 wherein the roller drive mechanism includes:
   a carriage;
   mounts for rotatably mounting the roller to the carriage;
   guides for guiding the carriage along a path of motion with respect to the base during the cartridge opening and closing strokes; and
   a carriage drive assembly for rotating the roller during the cartridge opening stroke, and for driving the carriage about its path of motion to cause rotation of the roller during the cartridge closing stroke.

4. The opening and closing mechanism of claim 3 and further including;
   brackets for swingably mounting the roller to the carriage; and
   springs coupled between the brackets and carriage for biasing the roller toward the base and into engagement with the cartridge.

5. The opening and closing mechanism of claim 3 wherein the carriage drive assembly includes:
   a roller drive linkage for causing the rotation of the roller during the cartridge opening stroke; and
   a track drive linkage for causing the carriage to be driven about its path of motion during the cartridge closing stroke.

6. The opening and closing mechanism of claim 5 wherein the carriage drive assembly further includes:
   a motor mounted to the carriage; and
   a shuttle linkage for coupling the motor to the roller drive linkage during the cartridge opening stroke, and for coupling the motor to the track drive linkage during the cartridge closing stroke.

7. The opening and closing mechanism of claim 6 wherein:
   the carriage drive mechanism further includes a rack mounted with respect to the base; and
   the track drive linkage includes a gear for engaging the rack and driving the carriage with respect to the base during the cartridge closing stroke.

8. The opening and closing mechanism of claim 7 wherein the shuttle linkage includes means for disengaging the motor from the roller to enable free rotation of the roller during the cartridge closing stroke, and for disengaging the motor from the track drive linkage to enable free movement of the carriage along the path of motion during the cartridge opening stroke.

9. The opening and closing mechanism of claim 2 and further including a biasing mechanism for biasing the roller toward the base and into engagement with the cartridge.

10. The opening and closing mechanism of claim 2 wherein the roller includes an elongated member having ends of circular cross section configured for engagement with the cartridge.

11. The opening and closing mechanism of claim 10 wherein the roller further includes an elongated cylindrical portion between the ends.

12. The opening and closing mechanism of claim 11 wherein the cylindrical portion of the roller includes a cutout portion.

13. The opening and closing mechanism of claim 12 wherein the roller further includes cover-engaging fingers extending from the elongated portion between the ends.

14. The opening and closing mechanism of claim 2 wherein the roller includes cover-engaging fingers.

15. The opening and closing mechanism of claim 1 wherein:
the mechanism is configured for use with a cartridge of the type having a tray with a lip extending from a forward edge; and
the base includes a forward edge with a resilient member for supporting the forward edge of the cartridge tray.

16. The opening and closing mechanism of claim 1 wherein:
the mechanism is configured for use with a cartridge of the type having a tray with lips extending from side edges; and
the base includes lips for supporting the lips extending from the side edges of the tray.

17. The opening and closing mechanism of claim 1 wherein:
the mechanism is configured for use with a cartridge of the type including positioning guide-receiving recesses; and
the base includes positioning guides.

18. An opening and closing mechanism for photographic film cartridges of the type having a film-receiving tray with outwardly extending front and side lips and a flexible cover for the tray resealably engaged with the lips, the opening and closing mechanism including:
a base for receiving the cartridge, the base including front and side lips for supporting the front and side lips of the cartridge tray;
a carriage mounted for movement with respect to the base;
a roller including a cartridge cover-engaging mechanism;
a mount for rotatably and movably mounting the roller to the carriage;
a biasing mechanism for biasing the roller toward engagement with the lips of the base;
a carriage drive assembly for rotating the roller in a first direction to peel the cover from the tray and wind the cover onto the roller during a cartridge opening stroke, and for driving the carriage with respect to the base to rotate the roller in a second direction and unwind and reseal the cover onto the tray during a cartridge closing stroke.

19. The opening and closing mechanism of claim 18 wherein the carriage drive assembly includes:
a roller drive linkage for causing the rotation of the roller during the cartridge opening stroke; and
a track drive linkage for driving the carriage with respect to the base during the cartridge closing stroke.

20. The opening and closing mechanism of claim 19 wherein the carriage drive assembly further includes:
a rack mounted with respect to the base for engagement by the track drive linkage;
a motor mounted to the carriage; and
an electrically actuated shuttle linkage for coupling the motor to the roller drive linkage and disengaging the motor from the track drive linkage during the cartridge opening stroke, and for coupling the motor to the track drive linkage and disengaging the motor from the roller drive linkage during the cartridge closing stroke.

21. The opening and closing mechanism of claim 18 wherein the roller has ends of circular cross section biased toward engagement with the side lips of the base.

22. The opening and closing mechanism of claim 21 wherein the roller includes an elongated wrapping portion between the ends, the wrapping portion of partial circular cross section with a cutout portion.

23. The opening and closing mechanism of claim 22 wherein the cartridge cover-engaging mechanism of the roller includes fingers extending from the wrapping portion of the roller.

24. The opening and closing mechanism of claim 23 wherein the fingers of the roller are arcuate and have radii equal to the radius of the partial circular wrapping portion.

25. The opening and closing mechanism of claim 18 wherein the front lip of the base includes a resilient member for supporting the front lip of the cartridge tray.

26. The opening and closing mechanism of claim 18 wherein the base further includes cartridge positioning guides.

* * * * *

UNITED STATES PATENT AND TRADEMARK OFFICE
CERTIFICATE OF CORRECTION

PATENT NO. : 5,132,724
DATED : July 21, 1992
INVENTOR(S) : Lemberger et al.

It is certified that error appears in the above-identified patent and that said Letters Patent is hereby corrected as shown below:

On the title page, item: [75], change "Richard R. Lemberger; Paul C. Schubert; Terrence H. Joyce, all of St. Paul, Minn." to -- Richard R. Lemberger, Forrest Lake, Minn.; Paul C. Schubert, Marine on St. Croix, Minn.; Terrence H. Joyce, Burnsville, Minn.--.

Col. 4, line 53, after "vacuum", insert --within--.

Col. 9, line 33, change "bee" to --been--.

Signed and Sealed this

Eleventh Day of January, 1994

Attest:

BRUCE LEHMAN

*Attesting Officer*    *Commissioner of Patents and Trademarks*